US011261265B2

(12) United States Patent
Swarup et al.

(10) Patent No.: US 11,261,265 B2
(45) Date of Patent: Mar. 1, 2022

(54) ACRYLIC POLYMERS, AQUEOUS POLYMERIC DISPERSIONS PREPARED THEREFROM, AND CURABLE FILM-FORMING COMPOSITIONS PREPARED THEREFROM

(71) Applicant: PPG INDUSTRIES OHIO, INC., Cleveland, OH (US)

(72) Inventors: Shanti Swarup, Allison Park, PA (US); Deena M. McHenry, Cranberry Township, PA (US); David Walters, Slippery Rock, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 388 days.

(21) Appl. No.: 16/521,864

(22) Filed: Jul. 25, 2019

(65) Prior Publication Data

US 2021/0024661 A1    Jan. 28, 2021

(51) Int. Cl.

| | |
|---|---|
| *C08F 2/20* | (2006.01) |
| *C08F 20/18* | (2006.01) |
| *C08F 20/32* | (2006.01) |
| *C08F 20/34* | (2006.01) |
| *C08F 30/08* | (2006.01) |
| *C08L 75/02* | (2006.01) |
| *C08L 75/04* | (2006.01) |
| *C09D 133/06* | (2006.01) |
| *C09D 133/08* | (2006.01) |
| *C09D 133/14* | (2006.01) |
| *C09D 143/04* | (2006.01) |

(52) U.S. Cl.
CPC .............. *C08F 2/20* (2013.01); *C08F 20/18* (2013.01); *C08F 20/32* (2013.01); *C08F 20/34* (2013.01); *C08F 30/08* (2013.01); *C08L 75/02* (2013.01); *C08L 75/04* (2013.01); *C09D 133/066* (2013.01); *C09D 133/08* (2013.01); *C09D 133/14* (2013.01); *C09D 143/04* (2013.01); *B05D 2210/00* (2013.01); *B05D 2401/20* (2013.01); *B05D 2502/00* (2013.01)

(58) Field of Classification Search
CPC .......... C08F 20/02; C08F 20/04; C08F 20/06; C08F 20/08; C08F 20/10; C08F 20/12; C08F 20/14; C08F 20/16; C08F 20/18; C08F 20/20; C08F 20/26; C08F 20/28; C08F 20/30; C08F 20/32; C08F 20/34; C08F 20/36; C08F 20/40; C08F 220/00; C08F 220/02; C08F 220/04; C08F 220/06; C08F 220/08; C09D 133/02; C09D 133/04; C09D 133/062; C09D 133/064; C09D 133/066; C09D 133/068; C09D 133/08; C09D 133/10; C09D 133/12; C09D 133/14; C09D 143/04; C08G 18/61; C08G 18/615; C08G 18/62; C08G 18/6212; C08G 18/6216; C08G 18/622; C08G 18/6225; C08G 18/6229; C08G 18/6233; C08G 18/6237; C08G 18/6241; C08G 18/625; C08G 18/6254; C08G 18/6258; C08G 18/627
See application file for complete search history.

(56) References Cited

U.S. PATENT DOCUMENTS

| | | |
|---|---|---|
| 6,399,691 B1 | 6/2002 | Melchiors et al. |
| 6,881,786 B2 | 4/2005 | Swarup et al. |
| 6,884,845 B2 | 4/2005 | Swarup et al. |
| 7,199,178 B2 | 4/2007 | Melchiors et al. |
| 8,242,211 B2 | 8/2012 | Swarup et al. |
| 9,187,670 B1 * | 11/2015 | Schwendeman ........ C08L 33/16 |
| 2005/0131132 A1 | 6/2005 | Huybrechts |
| 2010/0190923 A1 | 7/2010 | Swarup et al. |

FOREIGN PATENT DOCUMENTS

| | | | |
|---|---|---|---|
| EP | 0571187 A1 * | 11/1993 | ............. C08G 18/60 |
| JP | 2002293969 A * | 10/2002 | |
| WO | 03/070783 A1 | 8/2003 | |
| WO | 2016/040429 A1 | 3/2016 | |
| WO | 2018/213479 A1 | 11/2018 | |

OTHER PUBLICATIONS

JP2002293969 English Machine Translation, prepared Sep. 17, 2021. (Year: 2021).*

* cited by examiner

*Primary Examiner* — Christopher M Rodd
(74) *Attorney, Agent, or Firm* — Krisanne Shideler

(57) ABSTRACT

The present invention is directed to an acrylic polymer prepared from a reaction mixture comprising: (i) an ethylenically unsaturated monomer comprising hydroxyl functional groups; (ii) an ethylenically unsaturated monomer comprising polydialkylsiloxane groups; (iii) an ethylenically unsaturated monomer comprising carboxylic acid functional groups or amine functional groups; and (iv) a reactive diluent that is reactive with the ethylenically unsaturated monomer (iii). The reactive diluent (iv) is present initially in the reaction mixture as a medium in which the monomers polymerize. The present invention is further directed to aqueous polymeric dispersions prepared therefrom and aqueous, curable film-forming compositions prepared from the dispersions. The curable film-forming compositions are low VOC and are useful in methods of mitigating dirt build-up on a substrate.

11 Claims, No Drawings

ACRYLIC POLYMERS, AQUEOUS POLYMERIC DISPERSIONS PREPARED THEREFROM, AND CURABLE FILM-FORMING COMPOSITIONS PREPARED THEREFROM

FIELD OF THE INVENTION

The present invention relates to acrylic polymers, aqueous polymeric dispersions thereof, and low VOC curable film-forming compositions prepared therefrom.

BACKGROUND OF THE INVENTION

Easy cleaning of coated surfaces is a significant selling point for many industries, in both consumer and industrial markets. Easy removal of dirt and prevention of dirt build-up are desirable properties for products such as automobiles. Environmental contaminants such as tar, asphalt, animal droppings, road salt, detergents, and the like may damage the surface of coated vehicles, architectural surfaces, and other industrial substrates. Damage may be caused by a chemical reaction of the contaminant with the coated surface such as by chemical etching, or may involve physical removal of part or all of the coating from the substrate (i.e., "cohesive failure") upon removal of the contaminant during cleaning. Cohesive failure may also involve incomplete removal of the contaminant from the coated surface during cleaning.

The automotive industry has taken an interest in developing coatings that are easy to clean. However, such coatings must meet new environmental requirements. Environmental concerns and more stringent governmental regulations have prompted development in recent years of coating compositions having low levels of organic solvents ("low VOC") to minimize solvent emissions. Waterborne and powder coating compositions have been developed to meet these requirements. However, challenges still exist to develop low VOC emissions compositions that meet appearance and performance requirements such as easy cleaning, gloss, surface defect minimization, humidity resistance, etch resistance, etc., while using available components.

It would be desirable to provide low VOC polymers and coating compositions that may be used in methods of mitigating dirt build-up on a substrate in order to prevent such damage to coatings.

SUMMARY OF THE INVENTION

The present invention is directed to an acrylic polymer prepared from a reaction mixture comprising:
 (i) an ethylenically unsaturated monomer comprising hydroxyl functional groups, present in the reaction mixture in an amount of 10 to 40 percent by weight, based on the total weight of the reaction mixture;
 (ii) an ethylenically unsaturated monomer comprising polydialkylsiloxane groups, present in the reaction mixture in an amount of 2 to 10 percent by weight, based on the total weight of the reaction mixture;
 (iii) an ethylenically unsaturated monomer comprising carboxylic acid functional groups or amine functional groups, present in the reaction mixture in an amount of 5 to 30 percent by weight, based on the total weight of the reaction mixture; and
 (iv) a reactive diluent that is reactive with the ethylenically unsaturated monomer (iii), present in the reaction mixture in an amount of 20 to 60 percent by weight, based on the total weight of the reaction mixture. The reactive diluent (iv) is present initially in the reaction mixture as a medium in which the monomers polymerize.

The present invention is further directed to aqueous polymeric dispersions prepared from the acrylic polymer and aqueous, curable film-forming compositions prepared from the dispersions. The curable film-forming compositions are low VOC as described below and are useful in methods of mitigating dirt build-up on a substrate.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The acrylic polymer of the present invention comprises: (i) hydroxyl functional groups; (ii) polydialkylsiloxane groups; and (iii) carboxylic acid functional groups or amine functional groups.

By "polymer" is meant a polymer including homopolymers and copolymers, and oligomers. By "composite material" is meant a combination of two or more different materials.

The term "(meth)acrylate" is meant to encompass acrylate and/or methacrylate molecular structures where they exist.

The acrylic polymer of the present invention can be prepared from a reaction mixture comprising:
(i) an ethylenically unsaturated monomer comprising hydroxyl functional groups;
(ii) an ethylenically unsaturated monomer comprising polydialkylsiloxane groups;
(iii) an ethylenically unsaturated monomer comprising carboxylic acid functional groups or amine functional groups; and
(iv) a reactive diluent that is reactive with the ethylenically unsaturated monomer (iii).

Useful hydroxyl functional ethylenically unsaturated monomers for use as the monomer (i) include hydroxyalkyl (meth)acrylates, typically having 2 to 5 carbon atoms in the hydroxyalkyl group, such as hydroxyethyl (meth)acrylate, hydroxypropyl (meth)acrylate, 4-hydroxybutyl (meth)acrylate, hydroxy functional adducts of caprolactone and hydroxyalkyl (meth)acrylates. The ethylenically unsaturated monomer (i) comprising hydroxyl functional groups is usually present in the reaction mixture in an amount of at least 10 percent by weight, such as at least 15 percent by weight, or at least 20 percent by weight, based on the total weight of the reaction mixture. The ethylenically unsaturated monomer (i) comprising hydroxyl functional groups is usually present in the reaction mixture in an amount of at most 40 percent by weight, such as at most 35 percent by weight, or at most 30 percent by weight, based on the total weight of the reaction mixture. For example, the ethylenically unsaturated monomer (i) comprising hydroxyl functional groups may be present in the reaction mixture in an amount of 10 to 40 percent by weight, or 10 to 35 percent by weight, or 10 to 30 percent by weight, or 15 to 40 percent by weight, or 15 to 35 percent by weight, or 15 to 30 percent by weight, or 20 to 40 percent by weight, or 20 to 35 percent by weight, or 20 to 30 percent by weight, based on the total weight of the reaction mixture.

The reaction mixture that may be used to prepare the acrylic polymer of the present invention further comprises (ii) an ethylenically unsaturated monomer comprising polydialkylsiloxane, usually polydimethylsiloxane, functional groups. Such monomers may be prepared, for example, by reacting a polydialkylsiloxane having hydroxyl end groups with an ethylenically unsaturated monomer that has functional groups reactive with hydroxyl groups, such as acid or epoxy functional groups.

Examples of suitable ethylenically unsaturated monomers comprising polydialkylsiloxane groups include SILMER Mo8 (available from Siltech Corporation), X-22-2426 (available from Shin-Etsu Chemical Co), MCR-M07, MCR-M11, MCR-M17, MCR-M22, MCS-M11, MFR-M15 and MFS-M15 (available from Gelest, Inc), FM-0711, FM-0721 and FM-0725 (available from JNC Corporation).

The ethylenically unsaturated monomer (ii) comprising polydialkylsiloxane groups typically has a weight average molecular weight of 1,000 to 30,000, measured by GPC using polystyrene calibration standards, 2 PL gel MIXED-C as the column, THF as eluent at 1 ml/min and refractive index detector. The polydialkylsiloxane group is typically at least oligomeric, such that the resulting ethylenically unsaturated monomer is often a macromonomer.

The ethylenically unsaturated monomer (ii) comprising polydialkylsiloxane groups is usually present in the reaction mixture in an amount of at least 2 percent by weight, such as at least 3 percent by weight, or at least 5 percent by weight, based on the total weight of the reaction mixture. The ethylenically unsaturated monomer (ii) comprising polydialkylsiloxane groups is usually present in the reaction mixture in an amount of at most 10 percent by weight, such as at most 8 percent by weight, or at most 6 percent by weight, based on the total weight of the reaction mixture. For example, the ethylenically unsaturated monomer (ii) comprising polydialkylsiloxane groups may be present in the reaction mixture in an amount of 2 to 10 percent by weight, or 2 to 8 percent by weight, or 2 to 6 percent by weight, or 3 to 10 percent by weight, or 3 to 8 percent by weight, or 3 to 6 percent by weight, or 5 to 10 percent by weight, or 5 to 8 percent by weight, or 5 to 6 percent by weight, based on the total weight of the reaction mixture.

Useful ethylenically unsaturated monomers (iii) comprising carboxylic acid functional groups include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The acrylic polymer prepared from a reaction mixture that includes an acid functional monomer as the ethylenically unsaturated monomer (iii) may be neutralized using an amine as known in the art, and the polymer may be an anionic polymer.

Useful ethylenically unsaturated monomers (iii) comprising primary or secondary amine functional groups include n-methyl-aminopropyl (meth)acrylate, aminoethyl (meth)acrylate, and aminobutyl (meth)acrylate. The acrylic polymer prepared from a reaction mixture that includes an amine functional monomer as the ethylenically unsaturated monomer (iii) may be neutralized using an acid as known in the art, and the polymer may be a cationic polymer.

The ethylenically unsaturated monomer (iii) comprising carboxylic acid functional groups or amine functional groups is usually present in the reaction mixture in an amount of at least 5 percent by weight, such as at least 8 percent by weight, or at least 10 percent by weight, based on the total weight of the reaction mixture. The ethylenically unsaturated monomer (iii) comprising carboxylic acid functional groups or amine functional groups is usually present in the reaction mixture in an amount of at most 30 percent by weight, such as at most 25 percent by weight, or at most 20 percent by weight, based on the total weight of the reaction mixture. For example, the ethylenically unsaturated monomer (iii) comprising carboxylic acid functional groups or amine functional groups may be present in the reaction mixture in an amount of 5 to 30 percent by weight, or 5 to 25 percent by weight, or 5 to 20 percent by weight, or 8 to 30 percent by weight, or 8 to 25 percent by weight, or 8 to 20 percent by weight, or 10 to 30 percent by weight, or 10 to 25 percent by weight, or 10 to 20 percent by weight, based on the total weight of the reaction mixture.

The reactive diluent (iv) in the reaction mixture used to form the acrylic polymer may be reactive with the ethylenically unsaturated monomer (iii). As used herein, the term "reactive diluent" means a substance that dilutes a mixture, such as by dissolving a solute and/or by serving as a dispersion medium in which other components of the mixture are dispersed, resulting in a solution or dispersion, and wherein the reactive diluent reacts with at least a portion of the solute and/or dispersed phase. The reactive solvent (ii) may be ethylenically saturated and/or include an oxirane (epoxy) ring reactive with a functional group of the ethylenically unsaturated monomer (iii). The reactive diluent may include, but is not limited to: 1,2-epoxypropane, 1,2-epoxybutane, 2,3-epoxybutane, epoxycyclohexane; 1,2-epoxycyclopentane, and 1,2-epoxycyclohexane ester of 2-ethyl hexane. The reactive diluent (iv) may contain no ethylenically unsaturated functionality. The reactive diluent (iv) is usually a liquid.

Commonly used glycidyl esters of an aliphatic saturated monocarboxylic acid useful as the reactive diluent (iv) include those of the structure:

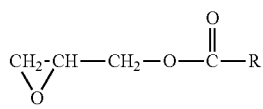

where R is an aliphatic saturated hydrocarbon radical containing from about 4 to about 26 carbon atoms. Preferably, R is a branched hydrocarbon group having from about 8 to about 10 carbon atoms, such as neopentyl, neoheptanyl or neodecanyl. Suitable glycidyl esters of carboxylic acids include CARDURA E10P and glycidyl esters of VERSATIC ACID 911, each of which is commercially available from Hexion (Columbus, Ohio). The reactive diluent (iv) typically makes up the remainder of the reaction mixture and is usually present in the reaction mixture in an amount of at least 20 percent by weight, such as at least 22 percent by weight, or at least 25 percent by weight, based on the total weight of the reaction mixture. The reactive diluent (iv) is usually present in the reaction mixture in an amount of at most 60 percent by weight, such as at most 40 percent by weight, or at most 30 percent by weight, based on the total weight of the reaction mixture. For example, the reactive diluent (iv) may be present in the reaction mixture in an amount of 20 to 60 percent by weight, or 20 to 40 percent by weight, or 20 to 30 percent by weight, or 22 to 60 percent by weight, or 22 to 40 percent by weight, or 22 to 30 percent by weight, or 25 to 60 percent by weight, or 25 to 40 percent by weight, or 25 to 30 percent by weight, based on the total weight of the reaction mixture.

The reactive diluent (iv) is present initially in the reaction mixture as the medium in which the monomers polymerize and when it contains epoxy functionality, may react with carboxylic acid functional groups present on the ethylenically unsaturated monomer (iii) in the reaction mixture. Typically, the carboxylic acid functional groups on the ethylenically unsaturated monomer (iii) are present in the reaction mixture in stoichiometric excess with respect to epoxy functional groups in the reactive diluent (iv). For example, the equivalent ratio of the carboxylic acid groups from the carboxylic acid group-containing monomer to the epoxy group of a glycidyl ester of an aliphatic saturated monocarboxylic acid may be at least 1.1:1, in other instances 1.2:1 and in other cases at least 1.25:1. Usually, the carboxylic acid functional groups of the carboxylic acid functional monomers (iii) react with the epoxy group of a glycidyl ester (iv) of an aliphatic saturated monocarboxylic acid, resulting in the formation of the corresponding ester group and a secondary hydroxyl group.

One or more other polymerizable ethylenically unsaturated monomers (v) that are different from the monomers (i) (ii) and (iii) may be included in the reaction mixture that may be used to prepare the acrylic polymer of the present invention. Useful alkyl esters of acrylic acid or methacrylic acid include aliphatic alkyl esters containing from 1 to 30, and preferably 4 to 18 carbon atoms in the alkyl group. Non-limiting examples include: methyl(meth)acrylate, ethyl (meth)acrylate, propyl(meth)acrylate, n-butyl(meth)acrylate, t-butyl(meth)acrylate, 2-ethylhexyl(meth)acrylate, isobornyl (meth)acrylate, dimethylaminoethyl (meth)acrylate, n-butoxy methyl (meth)acrylamide, lauryl (meth)acrylate, cyclohexyl (meth)acrylate and 3,3,5-trimethylcyclohexyl (meth)acrylate. Other non-limiting examples of suitable monomers include (meth)acrylamide, N,N dialkyl (meth)acrylamides, dimethylaminoethyl (meth)acrylate, vinyl aromatic compounds such as styrene and vinyl toluene, nitriles such as (meth)acrylonitrile, vinyl and vinylidene halides such as vinyl chloride and vinylidene fluoride and vinyl esters such as vinyl acetate. 2-Ethyl hexyl acrylate is most often used.

When used, these additional ethylenically unsaturated monomers are typically present in the reaction mixture used to prepare the acrylic polymer in an amount of 5 to 50 percent by weight, more often 10 to 30 percent by weight, based on the total weight of monomers in the reaction mixture.

Usually, the reaction mixture is essentially free of non-reactive organic solvent; i.e., any organic solvent other than the reactive diluent (iv) described above, which serves initially as the reaction medium for the reaction mixture. As used herein, the term "non-reactive organic solvent" means an organic substance that dissolves a solute resulting in a solution and does not react with the solute. By "essentially free" of a material is meant that a composition has only trace or incidental amounts of a given material, and that the material is not present in an amount sufficient to affect any properties of the composition; typically less than 0.2 percent by weight, such as less than 0.1 percent by weight, or less than 0.05 percent by weight, based on the total weight of the reaction mixture.

The acrylic polymer of the present invention may be prepared by polymerizing a mixture of the ethylenically unsaturated polymerizable monomers described above in the presence of the reactive diluent (iv). Exemplary methods are described in the examples below.

The polymerization described above is generally carried out by introducing the monomer mixture that includes the monomers (i), (ii), and (iii) (and (v) when used) to a suitable reactor to which at least one reactive diluent (iv) is also added. A suitable free radical polymerization initiator may be added.

Any suitable free radical initiator may be used in the polymerization. Suitable free radical initiators include, but are not limited to, thermal initiators, photoinitiators and oxidation-reduction initiators. Examples of thermal initiators include, but are not limited to, azo compounds, peroxides and persulfates. Suitable persulfates include, but are not limited to, sodium persulfate and ammonium persulfate. Oxidation-reduction initiators may include, as non-limiting examples persulfate-bisulfite systems as well as systems utilizing thermal initiators in combination with appropriate metal ions such as iron or copper.

Suitable azo compounds include, but are not limited to, non-water-soluble azo compounds such as 1-1'-azobis(cyclohexanecarbonitrile), 2-2'-azobisisobutyronitrile, 2-2'-azobis(2-methylbutyronitrile), 2-2'-azobis(propionitrile), 2-2'-azobis(2,4-dimethylvaleronitrile), 2-2'-azobis(valeronitrile), 2-(carbamoylazo)-isobutyronitrile and mixtures thereof, and water-soluble azo compounds such as azobis tertiary alkyl compounds include, but are not limited to, 4-4'-azobis(4-cyanovaleric acid), 2-2'-azobis(2-methylpropionamidine) dihydrochloride, 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride and mixtures thereof.

Suitable peroxides include, but are not limited to, hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

The resulting acrylic polymer may have a hydroxyl value of at least 50, in some cases at least 100, in other cases at least 150. Additionally, the acrylic polymer may have a hydroxyl value of not more than 250, in some cases not more than 225, in other cases not more than 200, based on the total weight of the acrylic polymer. The hydroxyl value may be determined using ASTM E222-10 (2010). The hydroxyl value of the acrylic polymer may be any value or any range of values inclusive of those stated above. For example, the resulting acrylic polymer may have a hydroxyl value of 50 to 250, or 50 to 225, or 50 to 200, or 100 to 250, or 100 to 225, or 100 to 200, or 150 to 250, or 150 to 225, or 150 to 200, based on the total weight of the acrylic polymer.

As described above, the carboxylic acid functional monomer, when used, may be present in stoichiometric excess compared to epoxy groups on the reactive diluent. Thus, the acrylic polymer may contain carboxylic acid functionality resulting from residual or unreacted carboxylic acid groups. The acrylic polymer may have an acid value of at least 1, in some cases at least 2, in other cases at least 5, in some instances at least 10 and in other instances at least 25 mg KOH/g resin. Additionally, the acrylic polymer may have an acid value of not more than 100, in some cases not more than 75, in other cases not more than 50, in some instances not more than 40 and in other instances not more than 35 mg KOH/g resin. The acid value (number of milligrams of KOH per gram of solid required to neutralize the acid functionality in the resin) is a measure of the amount of acid functionality in the resin. The acid value of the acrylic polymer may be any value or any range of values inclusive of those stated above. For example, the resulting acrylic polymer may have an acid value of 1 to 100 mg KOH/g resin, or 1 to 75 mg KOH/g resin, or 1 to 50 mg KOH/g resin, or 1 to 40 mg KOH/g resin, or 1 to 35 mg KOH/g resin, or 2 to 100 mg KOH/g resin, or 2 to 75 mg KOH/g resin, or 2 to 50 mg KOH/g resin, or 2 to 40 mg KOH/g resin, or 2 to 35 mg KOH/g resin, 5 to 100 mg KOH/g resin, or 5 to 75 mg KOH/g resin, or 5 to 50 mg KOH/g resin, or 5 to 40 mg KOH/g resin, or 5 to 35 mg KOH/g resin, 10 to 100 mg KOH/g resin, or 10 to 75 mg KOH/g resin, or 10 to 50 mg KOH/g resin, or 10 to 40 mg KOH/g resin, or 10 to 35 mg KOH/g resin, 25 to 100 mg KOH/g resin, or 25 to 75 mg KOH/g resin, or 25 to 50 mg KOH/g resin, or 25 to 40 mg KOH/g resin, or 25 to 35 mg KOH/g resin.

Typically, when the polymerization is complete and an ethylenically unsaturated monomer (iii) was used that comprises carboxylic acid functional groups, an amine is added to the acrylic polymer in an amount sufficient to provide a pH of from 6 to 10 when the acrylic polymer is dispersed in water to 30 to 35 percent by weight resin solids at ambient conditions. The pH may be increased by using one or more amines. Examples of suitable amines include, but are not limited to, ammonia, diethanolamine, dimethylethanolamine, triethyl amine and diethyl propanol amine. Use of the amine allows for formation of a stable, aqueous polymeric dispersion according to the invention, comprising the acrylic polymer above dispersed in an aqueous medium. As used herein, "stable dispersion" refers to a liquid having a liquid continuous phase and a dispersed phase, which may be a liquid, a solid or a combination thereof, where the dispersed phase does not agglomerate, coalesce, settle or separate from the continuous phase between the period of time the dispersion is prepared and when it is used, typically a period of time not exceeding six months at ambient conditions. By "ambient" conditions is meant without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.).

The present invention is further drawn to a curable film-forming composition comprising:

(a) a curing agent comprising reactive functional groups reactive with hydroxyl functional groups; and (b) the aqueous polymeric dispersion described above.

The curing agent (a) used in the curable film-forming composition may be selected from one or more polyisocyanates such as diisocyanates and triisocyanates including biurets and isocyanurates. Diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and/or 4,4'-diphenylmethylene diisocyanate. Biurets of any suitable diisocyanate including 1,4-tetramethylene diisocyanate and 1,6-hexamethylene diisocyanate may be used. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and α,α,α',α'-tetramethylmeta-xylylene diisocyanate. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

Trifunctional isocyanates may also be used as the curing agent, for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, and DESMODUR N 3390, which is the isocyanurate of hexamethylene diisocyanate, available from Bayer Corporation. Specifically used polyisocyanates are trimers of diisocyanates such as hexamethylene diisocyanate and isophorone diisocyanate. DESMODUR Z 4470 BA, an aliphatic polyisocyanate based on isophorone diisocyanate available from Bayer Corporation, is also suitable.

The polyisocyanate may also be one of those disclosed above, chain extended with one or more polyamines and/or polyols using suitable materials and techniques known to those skilled in the art to form a polyurethane prepolymer having isocyanate functional groups.

Mixtures of polyisocyanates are particularly suitable.

The curing agent (a) used in the curable film-forming composition may alternatively or additionally be selected from one or more aminoplast resins. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of such lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. Many aminoplast resins are partially alkylated with methanol or butanol.

The curing agent (a) is typically present in the film-forming compositions in an amount ranging from 10 to 90 percent by weight, such as 30 to 65 percent by weight, often 45 to 60 percent by weight, based on the total weight of resin solids in the composition.

The curable film-forming compositions of the present invention may further comprise a filler. Examples of fillers that can be present include finely divided minerals such as barium sulfate, silica, including fumed silica and colloidal silica, alumina, colloidal alumina, titanium dioxide, zirconia, colloidal zirconia, clay, mica, dolomite, talc, magnesium carbonate, calcium carbonate, calcium sulfate, calcium silicate, and/or calcium metasilicate. It is believed that the fillers, in combination with the resins in the composition, allow for useful rheological properties such as thixotropy. Fillers such as colloidal silica may also serve to enhance mar and scratch resistance.

The film-forming composition can additionally include a variety of optional ingredients and/or additives that are somewhat dependent on the particular application of the curable composition, such as other curing catalysts, pigments or other colorants, reinforcements, thixotropes, accelerators, surfactants, plasticizers, extenders, stabilizers, corrosion inhibitors, diluents, hindered amine light stabilizers, UV light absorbers, adhesion promoters, and antioxidants. The curable film-forming composition may be a color coat or clear coat.

The film-forming composition of the present invention is typically waterborne (in an aqueous medium); by "aqueous", "waterborne", and like terms is meant in a medium that either consists exclusively of water or comprises predominantly water; i.e., at least 50 percent by weight water, in combination with another material, such as, for example, an organic solvent. The composition may contain organic solvents as necessary for the purposes of formulation. Such solvents include alcohols, such as butanol; ketones, such as methyl amyl ketone and methyl isobutyl ketone; aromatic hydrocarbons, such as xylene; glycol ethers, such as propylene glycol methyl ether, propylene glycol monopropyl ether, ethylene glycol monobutyl ether, dipropylene glycol monomethyl ether, and ethylene glycol monohexyl ether; esters such as 2-butoxyethyl ester of acetic acid, oxo-hexyl acetate ester, and propylene glycol monomethyl ether acetate; other solvents; and mixtures of any of the foregoing. However, the curable film-forming compositions of the present invention are typically low VOC; i.e., the level of organic solvent in the curable film-forming compositions of the present invention is usually less than 30 percent by weight, often less than 20 percent by weight, based on the total weight of the curable film-forming composition.

The curable compositions used in the present invention can be prepared as a two-package composition, often curable at ambient temperature. Two-package curable compositions are typically prepared by combining the ingredients immediately before use, usually when a curing agent having free isocyanate groups is used. The curable film-forming compositions may alternatively be prepared as one-package systems, particularly when an aminoplast or capped polyisocyanate curing agent is used in the composition.

The curable film-forming compositions of the present invention may be used to prepare a coated substrate, comprising: A) a substrate having at least one coatable surface, and B) the curable film-forming composition described above, applied to at least one surface of the substrate.

Suitable substrates include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used.

In certain embodiments of the present invention, the substrate comprises a composite material such as a plastic or a fiberglass composite.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water, with a solvent, or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate may be a bare, cleaned surface; it may be oily, pretreated with one or more pretreatment compositions, and/or prepainted with one or more coating compositions, primers, topcoats, etc., applied by any method including, but not limited to, electrodeposition, spraying, dip coating, roll coating, curtain coating, and the like. The surface of the substrate may be further prepared by sanding or other conventional preparation processes.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 1-25 mils (25.4-635 microns), often 5-25 mils (127-635 microns).

The film-forming compositions can be applied directly to the surface of a substrate or onto a primer coat or other coating as noted above, such as an electrocoat or topcoat, on the substrate to form a coated substrate in accordance with the present invention. Suitable electrocoat compositions include ED 6465; primers include HP78224EH, both commercially available from PPG Industries, Inc. Alternatively, a primer may not be used and the film-forming compositions can be applied directly to a pigmented basecoat or other coating. Multiple coating layers such as an electrocoat and a primer and optionally a colored base coat may be applied to the substrate prior to application of the curable film-forming composition of the present invention. The curable film-forming compositions of the present invention are often used as clear coats in an automotive OEM or refinish setting.

After forming a film of the coating on the substrate, the composition can be cured by allowing it to stand at ambient temperature (such as a typical room temperature, 72° F. (22.2° C.)), or a combination of ambient temperature cure and baking, or by baking alone. The composition may be cured at ambient temperature typically in a period ranging from about 24 hours to about 36 hours. If ambient temperature and baking are utilized in combination, the composition is often allowed to stand ("flash") for a period of from about 2 minutes to about 120 minutes at a temperature ranging from ambient to 175° F. (79.4° C.), followed by baking at a temperature up to about 300° F. (148.9° C.), usually 285° F. (140.6° C.) for a period of time ranging from about 20 minutes to about 1 hour.

After application of the curable film-forming composition to the substrate and upon curing, the coated substrate demonstrates a water contact angle greater than 92°, often greater than 95°, and a total surface energy less than 29 mN/m, often less than 25 mN/m, measured as demonstrated in the Examples below. The coated substrate additionally demonstrates adhesive release of contaminants such as tar and sap from the surface. "Adhesive release" is a release of the tar or sap without removal of any of the coating composition from the substrate, as opposed to "cohesive release", wherein either at least a portion of the coating composition is removed with the contaminant, thereby damaging the coated substrate, or a portion of the contaminant remains attached to the coated substrate after cleaning.

Dirt build-up on a substrate may be mitigated by applying to at least a portion of the substrate the curable film-forming composition described above, and then at least partially curing the curable film-forming composition. A curable film-forming composition is applied to at least one surface of the substrate. A substrate may have one continuous surface, or two or more surfaces such as two opposing surfaces. Typically the surface that is coated is any that is expected to be exposed to conditions conducive to dirt build-up, such as consumer and industrial vehicles and building structures. By "dirt" is meant soil, grease, oil, minerals, detergent, salt, tar, asphalt, animal droppings, tree sap, and the like; contaminants that are commonly found outside or in industrial settings, and that tend to adhere to vehicle surfaces.

Each of the embodiments and characteristics described above, and combinations thereof, may be said to be encompassed by the present invention. For example, the present invention is thus drawn to the following nonlimiting aspects:

1. An acrylic polymer prepared from a reaction mixture comprising:
   (i) an ethylenically unsaturated monomer comprising hydroxyl functional groups, present in the reaction mixture in an amount of 10 to 40 percent by weight, based on the total weight of the reaction mixture;
   (ii) an ethylenically unsaturated monomer comprising polydialkylsiloxane groups, present in the reaction mixture in an amount of 2 to 10 percent by weight, based on the total weight of the reaction mixture;
   (iii) an ethylenically unsaturated monomer comprising carboxylic acid functional groups or amine functional groups, present in the reaction mixture in an amount of 5 to 30 percent by weight, based on the total weight of the reaction mixture; and
   (iv) a reactive diluent that is reactive with the ethylenically unsaturated monomer (iii), present in the reaction mixture in an amount of 20 to 60 percent by weight, based on the total weight of the reaction mixture; wherein the reactive diluent (iv) is present initially in the reaction mixture as a medium in which the monomers polymerize.
2. The acrylic polymer according to aspect 1, wherein the reaction mixture is essentially free of non-reactive organic solvent.
3. The acrylic polymer according to any of aspects 1 to 2, wherein the ethylenically unsaturated monomer (iii) comprises carboxylic acid functional groups and the reactive diluent (iv) comprises a glycidyl ester of an aliphatic saturated monocarboxylic acid.

4. The acrylic polymer according to aspect 3, wherein the carboxylic acid functional groups are on the ethylenically unsaturated monomer (iii) and are present in the reaction mixture in stoichiometric excess with respect to epoxy functional groups in the glycidyl ester of an aliphatic saturated monocarboxylic acid (iv).

5. The acrylic polymer of according to any of aspects 1 to 4, wherein the acrylic polymer demonstrates a hydroxyl value of 50 to 250, based on the total weight of the acrylic polymer.

6. The acrylic polymer according to any of aspects 1 to 5, wherein the reaction mixture further comprises (v) an additional ethylenically unsaturated monomer that is different from the monomers (i), (ii) and (iii).

7. An aqueous polymeric dispersion comprising the acrylic polymer according to any of aspects 3 to 6 dispersed in an aqueous medium, wherein the aqueous medium comprises an amine.

8. An aqueous, curable film-forming composition comprising:
   (a) a curing agent comprising reactive functional groups reactive with hydroxyl functional groups; and
   (b) the aqueous polymeric dispersion according to aspect 7.

9. The composition according to aspect 8, wherein the curing agent (a) comprises a polyisocyanate and/or an aminoplast.

10. The composition according to aspect 8 or 9, wherein the curing agent (a) comprises a mixture of polyisocyanates.

11. The composition according to any of aspects 8 to 10, wherein the composition contains less than 30 percent by weight non-reactive organic solvent, based on the total weight of the curable film-forming composition.

The following examples are intended to illustrate various embodiments of the invention, and should not be construed as limiting the invention in any way.

EXAMPLES

Curable film-forming compositions were prepared using the components shown in Table 1 below.

TABLE 1

CLEAR COATING EXAMPLES

| Name | Material Description | Manufacturer | Comparative Example 1 | Example 2 | Example 3 |
|---|---|---|---|---|---|
| Acrylic Resin A | Acrylic[1] | PPG | 322.6 | 0 | 0 |
| PDMS Modified Acrylic Resin B | Acrylic with PDMS[2] | PPG | 0 | 317.5 | 0 |
| PDMS Modified Acrylic Resin C | Acrylic with PDMS[3] | PPG | 0 | 0 | 317.5 |
| SURFYNOL 104E | Additive | Air Products | 4.0 | 4.0 | 4.0 |
| BYK 024 | Additive | BYK CHEMIE | 1.0 | 1.0 | 1.0 |
| BYK 381 | Additive | BYK CHEMIE | 2.9 | 2.9 | 2.9 |
| Butyl CELLOSOLVE | Solvent | Dow Chemical Co. | | | |
| EW8224 | Isocyanate Resin | PPG | 141.0 | 141.0 | 141.0 |
| T494 | Solvent | PPG | 129.6 | 129.6 | 129.6 |

[1]Acrylic Resin A consists of 29.1% Isobornyl Acrylate, 21.9% Hydroxyethyl Methacrylate, 2.7% m-Styrene Dimer, 4.7% Ethylhexyl Acrylate, 12.9% Acrylic Acid and 28.7% Glycidyl Ester of neodecanoic ester (Cardura E, equivalent weight 240, available from Hexion Specialty Chemicals). The reaction was carried out in glycidyl ester of neodecanoic ester at a temperature around 160° C. using free radical forming initiator. Upon the completion of the reaction, the excess acid groups left after reacting all the epoxy groups of Cardura E, were neutralized with diethanolamine and the polymer was then diluted to 31.0% weight solids with deionized water. The resulting polymer had a weight average a molecular weight of 9389 as measured by gel permeation chromatography, a Brookfield viscosity of 186 centipoise, as measured using ASTM D2196 (1999), and pH 8.5

[2]PDMS Modified Acrylic Resin B consists of 21.9% Ethylhexyl Acrylate, 26.8% Hydroxyethyl Methacrylate, 2.8% m-Styrene Dimer, 13.4% Acrylic Acid, 5.4% polydimethyl siloxane acrylate, KF-2012, available from Shin-Etsu Silicons from America 5000 molecular weight Polydimethylsiloxane and 29.6% Glycidyl Ester of neodecanoic ester. The reaction was carried out in glycidyl ester of neodecanoic ester at a temperature around 160° C. using free radical forming initiator. After the completion of the reaction, the excess acid groups were neutralized with diethanolamine and the polymer was then diluted to 30.8% weight solids with deionized water. The resulting polymer had a weight average molecular weight of 12201 as measured by gel permeation chromatography, a Brookfield viscosity of 400 centipoise, and pH 8.61.

[3]PDMS Modified Acrylic Resin C consists of 21.9% Isobornyl Acrylate, 26.7% Hydroxyethyl Methacrylate, 2.8% m-Styrene Dimer, 13.4% Acrylic Acid, 5.4% polydimethyl siloxane acrylate, KF-2012, available from Shin-Etsu Silicons from America and 29.7% Glycidyl Ester of neodecanoic ester. The reaction was carried out in glycidyl ester of neodecanoic ester at a temperature around 160° C. using free radical forming initiator. After the completion of the reaction, the excess acid groups were neutralized with diethanolamine and the polymer was then diluted to 30.8% weight solids with deionized water. The resulting polymer had a weight average molecular weight of 9170 as measured by gel permeation chromatography, a Brookfield viscosity of 76 centipoise, and pH 8.5.

Clear coat Comparative Example 1 and clear coat Examples 2 and 3 prepared according to the present invention were spray applied onto 4 inch by 12 inch cold rolled steel panels that were bare, then scuff sanded with 180 sand paper prior to application of the coatings. The substrate panels are available from ACT Test Panels LLC of Hillsdale, Mich. No basecoat was used. The clears were flashed for ten minutes at room temperature (72° F.) before baking for thirty minutes at 285° F. A dry film thickness (DFT) of 1.0-1.5 mils was targeted.

Water and Methylene Iodide contact angles were measured using a KRUSS DSA 100 instrument made by KRUSS GmbH of Hamburg, Germany and the associated software; 2004-2010. The surface energy numbers are based upon Owens-Wendt calculations. Clear coat Examples 2 and 3 have higher contact angles and lower surface energies as Table 2 shows below.

TABLE 2

| CLEAR COAT | Water Contact Angle ° | Methylene Iodide Contact Angle ° | Total Surface Energy mN/m |
|---|---|---|---|
| Comparative Example 1 | 75.6 | 37.20 | 42.85 |
| Example 2 | 98.30 | 78.05 | 19.54 |
| Example 3 | 101.05 | 73.65 | 21.84 |

Table 3 provides hardness values. The clear hardness was measured using the HM 2000 FISCHER hardness instrument available from Helmut Fischer GmbH+Co. KG of Sindelfingen, Germany. Table 3 shows that the hardness values of examples 2 and 3 are essentially equivalent to that of the comparative example 1.

TABLE 3

| CLEAR COAT | FISCHER Hardness N/mm² |
|---|---|
| Comparative Example 1 | 133 |
| Example 2 | 100 |
| Example 3 | 121 |

The cleanability testing results are shown in Table 4. The ability to release tar and tree sap from the clear surface is a measure of ease of cleaning. The test method is as follows:
1) Perform a visual assessment of each panel prior to testing.
2) Using a pipette, manually apply tree sap and tar to the panels in a row of five beads of approximately 75 cm diameters each across the four inch width of the panel, using a separate row for each material. The two rows of beads should be at least two inches apart.
3) Bake the test panels at 80° C. for one hour to simulate and accelerate baked-on contaminants.
4) Perform a visual assessment of the panels with material applied after one hour contact with the clearcoat.
5) Perform tar removal tests of each bead.
   a. The operator shall attempt to remove each of five beads of tar in one row using his/her fingers, using a "pinch and peel" technique to remove the tar. Gloves should be worn while performing the removal. Attempt to remove all beads of tar in the aforementioned manner.
   b. Assign and record visual measurement of tar removal, using reference standards for rating.
6) Perform tree sap removal tests of each bead.
   a. Using a cloth, attempt to wipe away each of five beads of tree sap in one row, one at a time, using a dry cloth. First, wipe the bead of the sap from the panel using a scooping motion. Perform two scoops on each bead. Then, attempt to remove the rest of the sap using a scrubbing motion. Perform three double rubs. Gloves should be worn while performing the removal. Attempt to remove all beads of tree sap in the aforementioned manner.
   b. Assign and record visual measurement of tree sap removal, using reference standards for rating.

Table 4 shows that the clear coating Examples 2 and 3 of the present invention are easier to clean as measured by the cleanability test (tar and tree sap release) from the coated surface. Note that the visual measurement rating for each test is recorded on a scale of 1 to 5, where 5 is the best with respect ease of removal of the contaminant without damage to the coating.

TABLE 4

| CLEAR COAT | Tar Peel Test | Sap Wipe |
|---|---|---|
| Comparative Example 1 | 2 | 2 |
| Example 2 | 4 | 3 |
| Example 3 | 3 | 3 |

Whereas particular embodiments of this invention have been described above for purposes of illustration, it will be evident to those skilled in the art that numerous variations of the details of the present invention may be made without departing from the scope of the invention as defined in the appended claims.

Therefore, we claim:

1. An acrylic polymer prepared from a reaction mixture comprising:
   (i) an ethylenically unsaturated monomer comprising hydroxyl functional groups, present in the reaction mixture in an amount of 10 to 40 percent by weight, based on the total weight of the reaction mixture;
   (ii) an ethylenically unsaturated monomer comprising polydialkylsiloxane groups, present in the reaction mixture in an amount of 2 to 10 percent by weight, based on the total weight of the reaction mixture;
   (iii) an ethylenically unsaturated monomer comprising carboxylic acid functional groups or amine functional groups, present in the reaction mixture in an amount of 5 to 30 percent by weight, based on the total weight of the reaction mixture; and
   (iv) a reactive diluent that is reactive with the ethylenically unsaturated monomer (iii), present in the reaction mixture in an amount of 20 to 60 percent by weight, based on the total weight of the reaction mixture; wherein the reactive diluent (iv) is present initially in the reaction mixture as a medium in which the monomers polymerize.

2. The acrylic polymer of claim 1, wherein the reaction mixture is essentially free of non-reactive organic solvent.

3. The acrylic polymer of claim 1, wherein the ethylenically unsaturated monomer (iii) comprises carboxylic acid functional groups and the reactive diluent (iv) comprises a glycidyl ester of an aliphatic saturated monocarboxylic acid.

4. The acrylic polymer of claim 3, wherein the carboxylic acid functional groups on the ethylenically unsaturated monomer (iii) are present in the reaction mixture in stoichiometric excess with respect to epoxy functional groups in the glycidyl ester of an aliphatic saturated monocarboxylic acid.

5. The acrylic polymer of claim 1, wherein the acrylic polymer demonstrates a hydroxyl value of 50 to 250, based on the total weight of the acrylic polymer.

6. The acrylic polymer of claim 1, wherein the reaction mixture further comprises (v) an additional ethylenically unsaturated monomer that is different from the monomers (i), (ii) and (iii).

7. An aqueous polymeric dispersion comprising the acrylic polymer of claim 3 dispersed in an aqueous medium, wherein the aqueous medium comprises an amine.

8. An aqueous, curable film-forming composition comprising:
   (a) a curing agent comprising reactive functional groups reactive with hydroxyl functional groups; and
   (b) the aqueous polymeric dispersion of claim 7.

9. The curable film-forming composition of claim 8, wherein the curing agent (a) comprises a polyisocyanate and/or an aminoplast.

10. The curable film-forming composition of claim 9, wherein the curing agent (a) comprises a mixture of polyisocyanates.

11. The curable film-forming composition of claim 8, wherein the curable film-forming composition contains less than 30 percent by weight non-reactive organic solvent, based on the total weight of the curable film-forming composition.

\* \* \* \* \*